United States Patent [19]

Chille, Sr.

[11] Patent Number: 5,435,422

[45] Date of Patent: Jul. 25, 1995

[54] AUTOMATIC WET TANK DRAIN VALVE

[76] Inventor: Frank A. Chille, Sr., 120 Elm Street, Apt. AQ3, Beverly, N.J. 08010

[21] Appl. No.: 345,916

[22] Filed: Nov. 28, 1994

Related U.S. Application Data

[63] Continuation of Ser. No. 700,339, May 7, 1991, abandoned, which is a continuation-in-part of Ser. No. 501,551, Mar. 30, 1990, abandoned, which is a continuation-in-part of Ser. No. 331,797, Apr. 3, 1989, abandoned.

[51] Int. Cl.⁶ ............................................. B01D 5/00
[52] U.S. Cl. .................................. 188/352; 137/204; 303/85
[58] Field of Search ................. 303/1, 7, 9, 13, 15, 303/11, 3, 85; 188/352; 137/203, 204; 251/129.03, 324

[56] References Cited

U.S. PATENT DOCUMENTS

| | | | |
|---|---|---|---|
| 821,120 | 5/1906 | Phillips | 251/324 X |
| 2,330,027 | 9/1943 | Churchman et al. | 137/204 |
| 2,330,040 | 9/1943 | Fitch | 303/1 |
| 2,666,126 | 1/1954 | Raines | 303/1 |
| 2,687,841 | 8/1954 | Churchman | 137/204 X |
| 2,845,081 | 7/1958 | George | 137/204 |
| 3,107,126 | 10/1963 | Valentine | 303/85 |
| 3,148,694 | 9/1964 | Casey et al. | 137/203 |
| 3,941,493 | 3/1976 | Pierson | 251/129.03 |
| 4,928,724 | 5/1990 | Margerum | 137/204 |

FOREIGN PATENT DOCUMENTS 0001174 2/1987 WIPO ................................. 137/203

Primary Examiner—Matthew C. Graham
Attorney, Agent, or Firm—Duane, Morris & Heckscher

[57] ABSTRACT

The invention relates to a drain valve and a method designed to drain condensate and contaminants from a wet tank in a pneumatic braking system for a vehicle. In a preferred embodiment the drain valve comprises a cylindrical piston disposed to slide axially within a cavity in a valve body constructed to be mounted on the vehicle and having two openings in the side wall of the valve body communicating with the cavity, one, an inlet opening connected upwardly to the wet tank, and, two, an outlet opening connected downwardly as a drain. The outlet is blocked in a closed, first position of the piston when the vehicle ignition is turned on. When the vehicle ignition is turned off the piston moves from the first position to a second position so as to open both the inlet and outlet openings together through the cavity in order to drain the wet tank. When the vehicle ignition is turned to the "on" position the piston moves back to the first position within the cavity so as to close the drain valve.

15 Claims, 4 Drawing Sheets

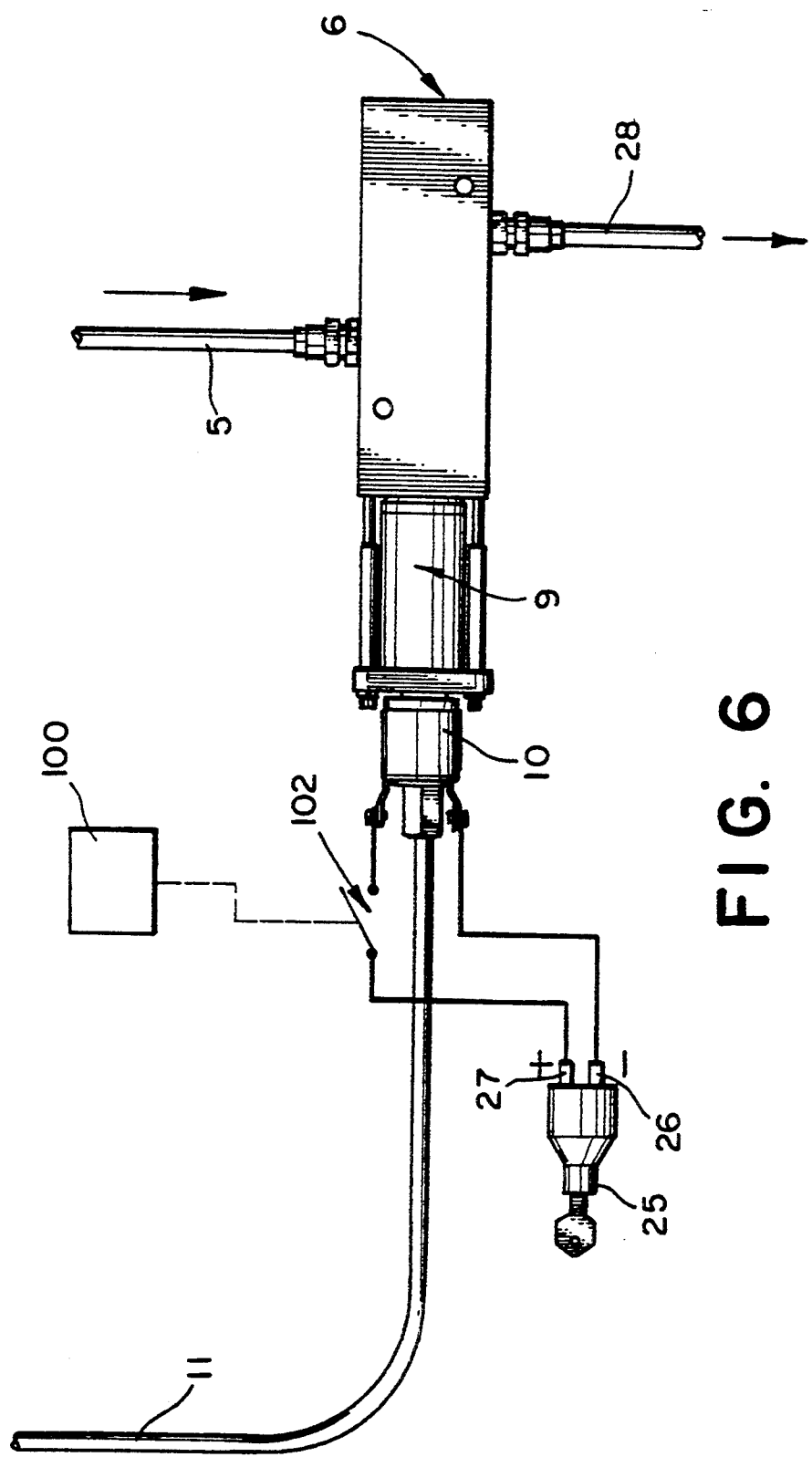

AUTOMATIC WET TANK DRAIN VALVE

This is a Continuation application of application Ser. No. 07/700,339, filed May 7, 1991, now abandoned which is a Continuation-In-Part of application Ser. No. 501,551, now abandoned which is a continuation-in-part of prior U.S. patent application Ser. No. 331,797 filed Apr. 3, 1989, now abandoned.

BACKGROUND OF THE INVENTION

The present invention relates to a drain valve which is used to drain condensate from a wet tank used in conjunction with pneumatic braking systems on vehicles such as buses, trucks, truck trailers, trains, construction equipment and large recreational vehicles.

Pneumatic braking systems in vehicles exhibit the condensation of water, oil and other impurities during compression and subsequent cooling of the pressurized air which is employed to actuate air driven pistons for the movement of drums and discs in the braking system. The pressurized air is stored in a plurality of tanks after it has been compressed during which it cools resulting in the condensation of water vapor, oil and other impurities present therein including compressor lubricating oil and gasoline vapor, the vast majority of which condense and collect in the air storage tank immediately connected to the compressor which is known as the "wet tank." The condensate collected in the "wet" tank must be drained periodically to prevent its entrainment into the braking system with the potential for damage to or functional degradation of the system. In the current state of the art, drainage is performed manually by the vehicle driver opening a manually operable, gravity drain valve located at the bottom of the wet tank. Industry standard procedure calls for the driver to drain the wet tank each time the truck's engine is shut-off. There are numerous disadvantages to this prior practice.

Drivers rarely drain the wet tank each time the engine is shut off or even on a regular relatively frequent basis with the result that the braking system is frequently damaged or compromised. This is both dangerous and costly.

Additionally, the manually operated drain valve is frequently located in an inaccessable position beneath the truck which subjects the driver to exposure to grease and dirt. This discourages the driver from draining the wet tank even if he remembers to so do.

It is an object of this present invention to provide a reliable, wet tank drainage system that works automatically in conjunction with a vehicle's ignition system or other electrical system which is periodically energized or de-energized or otherwise generates an electrical signal. This eliminates human inattention and thereby greatly reduces the danger and costs associated with damaging or functionally compromising the braking system.

BRIEF DESCRIPTION OF THE DRAWINGS

FIG. 6 is a modification of a portion of FIG. 1, depicting an alternative embodiment of the present invention.

DETAILED DESCRIPTION OF THE PREFERRED EMBODIMENT

Figure 1:
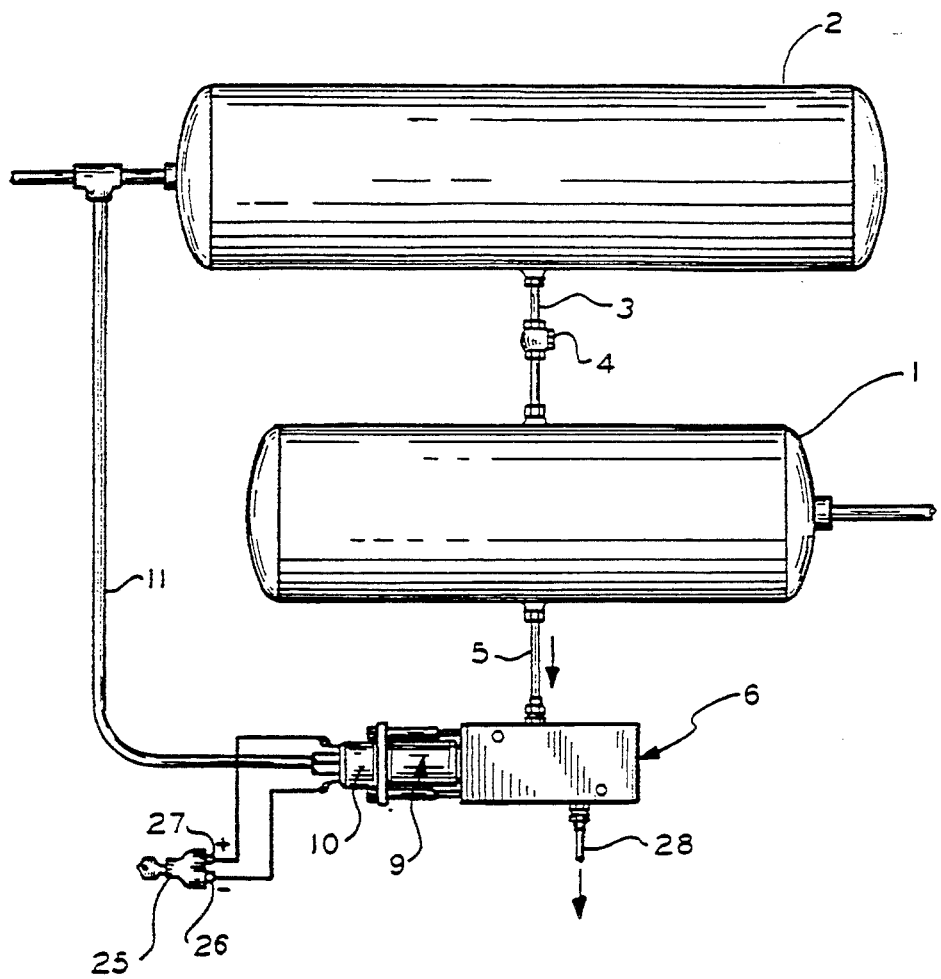
FIG. 1 is a schematic, side elevational view of the system showing the drain valve of the present invention connected to the wet tank of a pneumatic brake system of a vehicle.

A preferred embodiment of the invention is shown in the drawings, wherein like reference characters designate like or corresponding parts throughout the several views.

Referring now to the drawings in detail, FIG. 1 is a schematic side, elevational view of a wet tank 1 wherein condensed moisture and other impurities collect and a secondary air tank 2 connected to the wet tank 1 through an air line or conduit 3 which is provided with a one-way or check valve 4 to prevent air from escaping from the secondary tank 2 to the wet tank 1 when it is vented to the atmosphere to drain. Condensed moisture and impurities accumulated in the wet tank 1 are drained through service line or conduit 5 at the bottom of the wet tank, through the drain valve 6 of the present invention, when open, to discharge through the drain line 28.

Figure 2:
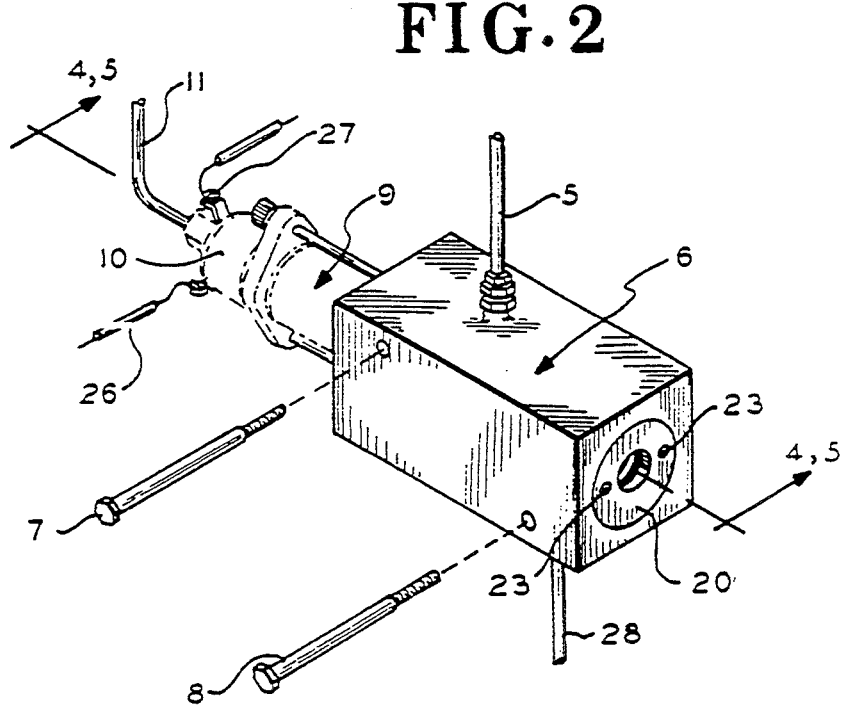
FIG. 2 is a perspective, side view of the drain valve showing the mounting bolts.

FIG. 2 is a perspective, side view of the drain valve, 6, which is attached to any appropriate part of the vehicle by mounting bolts 7, 8. The drain valve 6 is controlled by an electrically operated valve 10 which is operatively connected on one side to a source of air pressure through conduit 11 and on the other side to a pneumatic piston 9 having an external extension 12. Valve 10 is actuated by electricity from the vehicle's electrical system through its ignition switch 25 to contacts 26 and 27 on the valve 10. The contacts 26 and 27 may also be shrouded with insulating material to protect the electrical connection.

Figure 3:
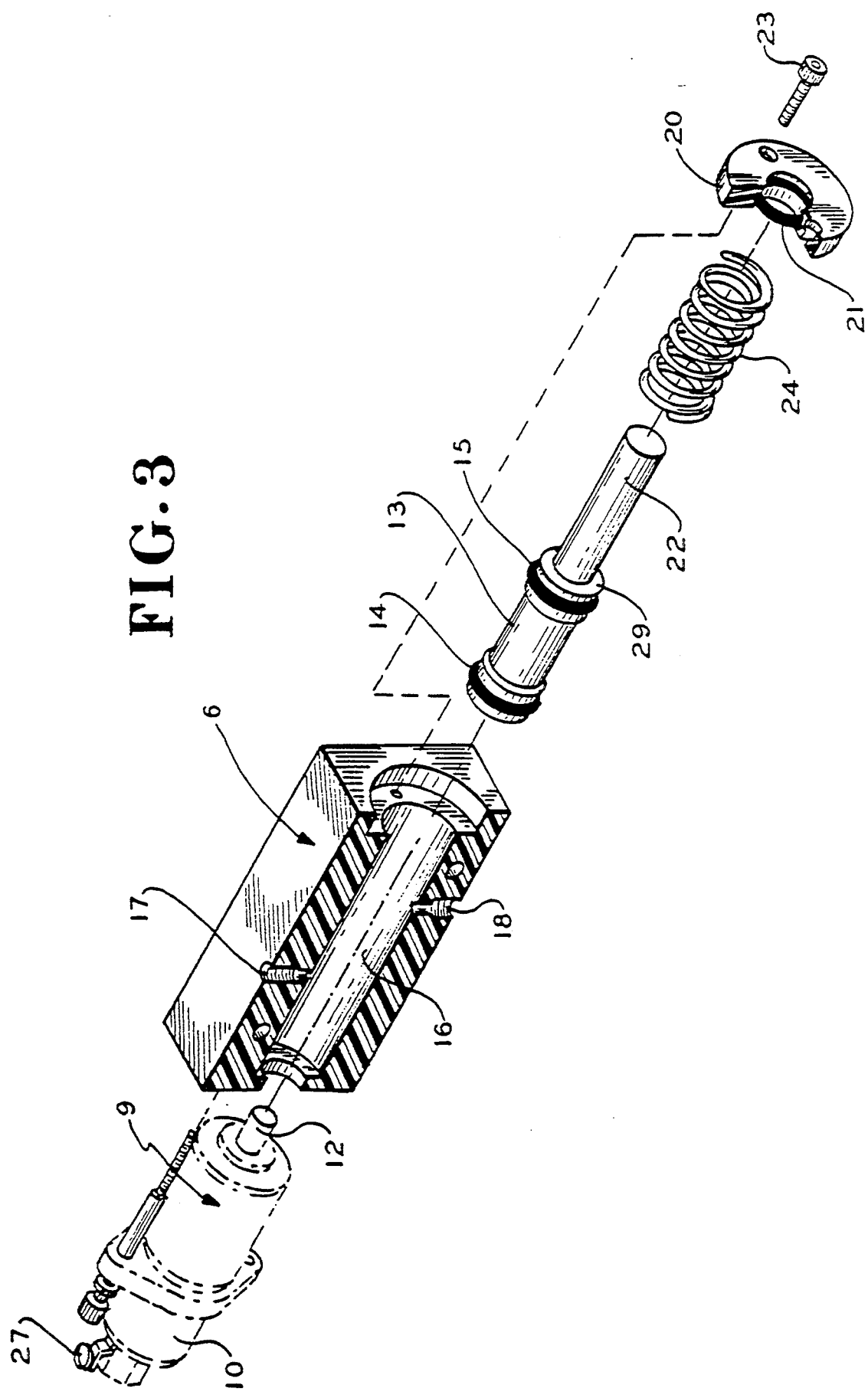
FIG. 3 is a perspective, exploded, partially sectional view of the drain valve along its longitudinal or operational axis.

FIG. 3, is a perspective, partially sectioned, exploded view of the drain valve 6, and shows the pneumatic piston 9 having the external extension 12 operatively engaged to a cylindrical drain valve piston 13 which carries two axially spaced-apart "0" rings 14, 15 thereon for water tight, axially slidable engagement within a conforming cylindrical, internal valve cavity 16 within the drain valve 6. The cavity 16 is open at the opposite ends of the valve 6. The valve 6 is provided with an inlet 17 in its top communicating with the internal cavity 16. The lowermost end of the service line 5 is connected to the inlet 17. The drain valve 6 is also provided with an outlet 18 in its bottom communicating with the cavity 16. The outlet 18 is spaced-apart from the inlet 17 along the long or operating axis of the valve 6, The piston 13 is retained within the cavity 16 by a retaining ring 20 which closes the end of the cavity 16 end opposite the pneumatic piston together with an "0" ring 21 which receives and seals the extension 22 of the drain piston 13. The retaining ring 20 is secured to the drain valve 6 by cap screws 23. The cavity 16 is closed at its opposite end by the external portion 12 of the pneumatic piston 9. The extension 22 on the drain valve piston 13 carries an axially mounted spring 24 which is compressible between the retaining ring 20 and an annular, radially extending shoulder 29 formed on the drain piston 13 within the cavity 16.

Figure 4:
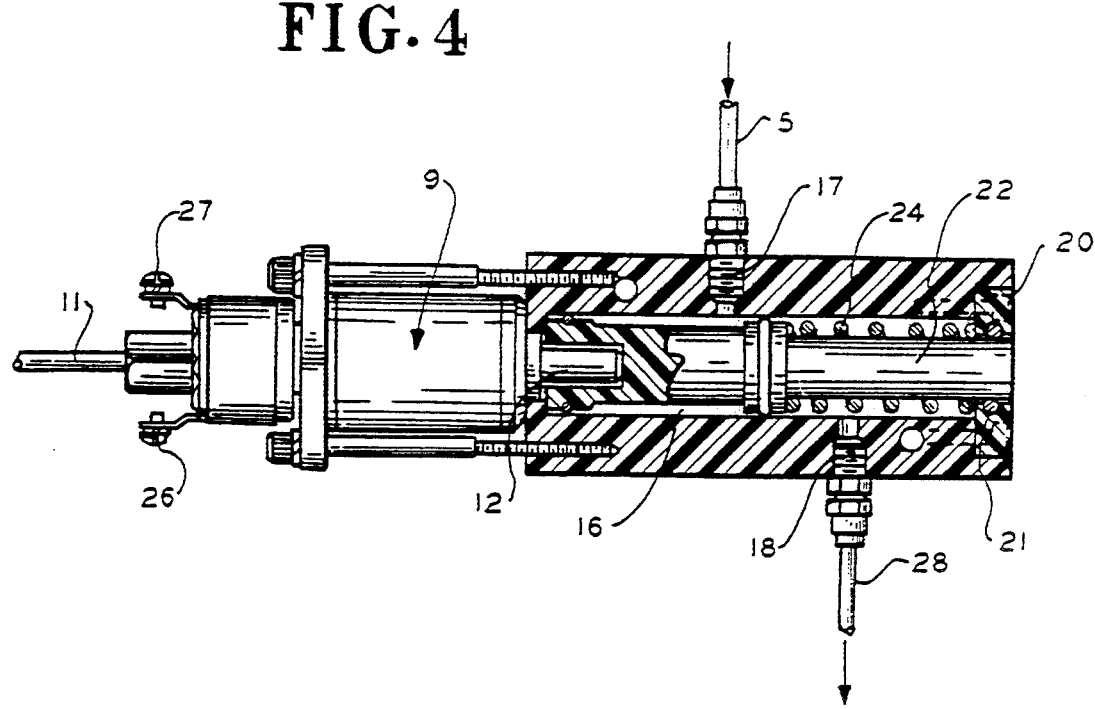
FIGS. 4 and 5 are partially sectioned, side elevational views of the drain valve taken along lines 4 and 5 on FIG. 2.
Figure 5:
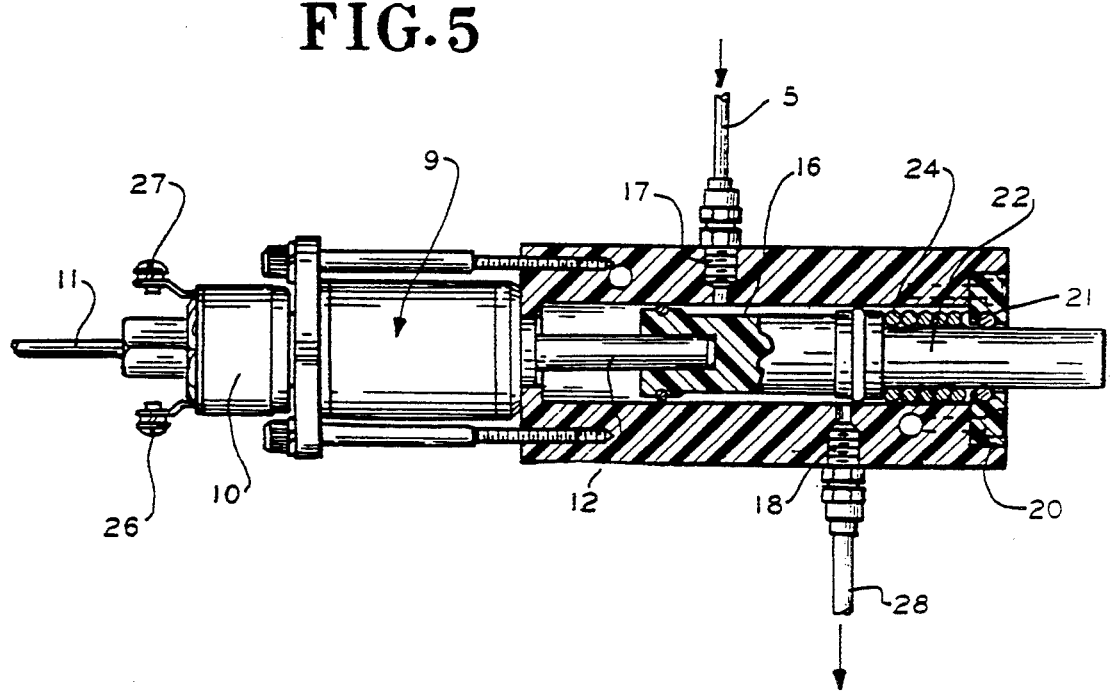

FIGS. 4 and 5 are partially sectioned, side elevational views of the valve 6 taken along lines 4, 5 in FIG. 2, FIG. 4 and shows the operational position of the drain valve 6 when the ignition switch 25 of the vehicle is in the "on" position and the drain valve piston 13 is in a closed position at rest within the cavity 16 by virtue of the expansive pressure of the spring 24. In this closed position, the pneumatic piston is disconnected from the source of air pressure by means of the electrically operated valve 10 and the inlet 17 and outlet 18 are sealed from each other by the "0" ring 15. The "0" rings 14, 15, 21 may be made of rubber, or neoprene, or similar materials resistant to water vapor and contaminants.

When the ignition key 25 is in the "off" position, the valve 10 is electrically actuated by power from the vehicle's electrical system, through the ignition switch 25 to terminals 26, 27 on the valve 10. This in turn connects the pneumatic piston 9 to a source of air pressure, driving its piston extension 12 longitudinally against the drain piston 13 moving it to the open position shown in FIG. 5. This opens the cavity 16 simultaneously to inlet 17 and outlet 18, thereby draining the wet tank 1 of accumulated liquid condensate and contaminants.

To close the drain valve 6, the ignition key is turned to the "on" position which closes the electrically operated valve 10 thereby disconnecting the pneumatic piston 9 from the source of air pressure. When the pneumatic piston 9 is disconnected from the source of air pressure, the spring 24 again drives the drain valve piston 13 to the closed position shown in FIG. 4. Means are provided for venting the pneumatic piston 9 when the air pressure valve 10 is closed. Such means are well-known in the art and need not be detailed further.

In the open position of the drain valve 6, when both the inlet 17 and outlet 18 are connected to the cavity 16, the condensate is discharged both by gravity and by escaping pressurized air from the wet tank 1 through the service line 5, the open inlet 17 to the cavity 16 and downwardly through the open outlet 18 to the waste line 28. When the ignition key 25 is turned on, so that the drain piston 13 is moved to its closed position by extension of the spring 24, the integrity of the pressurized air in the wet tank 1 and the brake system is maintained.

The extension 22 on the drain valve piston 13 extends beyond the drain valve 6 and can be manually driven to return the drain valve piston 13 to the "closed" position in the event that the spring 24 cannot close the valve 6 when its source of air pressure is disconnected by valve 10. This prevents such a malfunction of the drain valve 6 from preventing pressurization of the braking system.

It has been found that the braking system is always fully drained, which precludes the liquid containing water vapor and other contaminants such as oil, gasline vapor, alcohol vapor, etc. from damaging the system, including the remote brake drums and other devices, particularly those devices, such as "0" rings and seals, which are made of rubber, neoprene, plastic and similar materials which are easily attacked by water and contaminants. One of the factors which helps to achieve this full drainage result is that there is a purge of liquid contents and of pressurized air from wet tank 1 into the drain valve 6 because of the pressure differential between the pressurized wet tank 1 and the atmospheric pressure through the drain valve 6. Another factor which helps to achieve this full drainage result is that the drain valve 6 operates efficiently at all times, even in cold weather, because the air in the wet tank 1 is warmed by the air compressor and by braking action. The pressurized air goes in at approximately 95 psi to the wet tank 1 and shuts off at about 125 psi. Because of the direct service line 5 beween the wet tank 1 and the drain valve 6 into the cavity 16 between the two axially spaced-apart "0" rings 14, 15, the warm air is periodically forced downward through the service line 5 to warm the drain valve 6.

It has also been found that there is no accumulation of condensed liquid containing impurities in the secondary tank 2 because of the purging action of the drain valve 6.

In an alternative embodiment the condensed liquid containing impurities can be discharged from the drain valve 6 into a sump container for collection and storage, to be removed at a later time.

In the foregoing embodiment of FIG. 1, the valve 10 prevents pressurized air in the tank 2 from reaching the piston 9 via the conduit 11 when the ignition switch 25 is "on," thereby permitting the spring 24 to maintain the piston 13 and its associated "0" rings 14 and 15 in the normal positions shown in FIG. 4. When the ignition switch 25 moves from "or" to "off", the valve 10 permits air from the tank 2 via the conduit 11 to move the piston 9 and the valve piston 13 rightwardly against the spring 24 as in FIG. 5, thereby permitting purging of condensate from the tank 1. In an alternative embodiment, the ignition switch 25 need not be changed from "on" to "off" for purging to occur. Specifically, as shown in FIG. 6, between the ignition switch 25 and the valve 10, may be a timer 100. The timer 100 periodically causes momentary operation of the valve 10, whether or not the ignition switch 25 is moved from "on" to "off." Operation of the valve 10 is effected by disconnecting it from the ignition circuit controlled by the switch 25 when the switch 25 is "on", as by opening timer- controlled switch contacts 102. Thus, continued operation of a long-haul, over-the-road truck, during which the ignition switch 25 remains "on" for long periods, will not prevent periodic momentary purging of the tank 1. The time during which the valve 10 permits the pistons 9 and 13 to move to effect purging is adjusted so as to effect purging while not adversely affecting brake operation by unduly lowering the pressure of the air in the tank 2 or by affecting the pressurization of the tank 2 by the tank 1. Preferably, the momentary operation of the valve 10 is about 5 seconds and occurs every hour or so. In the embodiments of FIGS. 1-5, the valve 10 is maintained in a condition wherein the spring 24 holds the pistons 9 and 13 leftwardly when the ignition switch 25 is "on". If the timer 100 of FIG. 6 is used, it is as though an "off" condition of the switch 25 is periodically simulated by its opening of the contacts 102 leading to compression of the spring 24 and movement of the pistons 9 and 13 rightwardly. Thus, momentary purging occurs whenever power to the valve 10 is interrupted, either by the switch 25 going from "on" to "off" or by operation of the timer 100 with the switch 25 "on".

Although the foregoing description relates to purging pressurized-air, vehicle brake systems, the invention is obviously useful with other deviced, such as stand alone air compressor systems, which include condensate-collecting tanks for holding pressurized gas. The operation of a switch and/or timer similar to those 25 and/or 100 described above to affect an ignition or other electrical circuit will affect purging similar to that described.

It will be understood that the present invention is not limited to the structure or components disclosed herein by way of example.

The scope of the present invention is limited only by the appended claims.

I claim:

1. An improved drain valve for a pressurized tank associated with a system, the system including (i) a source of pressurized gas which supplies pressurized gas to the tank and (ii) a service line connected to the tank and normally blocked by the normally closed drain valve, the service line purging the tank of condensates when the drain valve is open; the system including a selectively energizeable electrical circuit, wherein the improvement comprises:

a valve body for the drain valve, the body including an elongated cavity, the service line and a drain line communicating with the cavity, the points of communication of the lines with the cavity being separated by a first distance measured along the cavity;

first means movable between a first location and a second location for closing the valve in the first location and for opening the valve in the second location, the first means including a piston movable through the cavity and carrying near each end thereof a sealing member which conformably, slidably seals against the cavity as the piston moves, the sealing members being separated by a second distance measured along the cavity which is greater than the first distance, the first location being characterized by the piston being positioned so that one of the sealing members is between the respective points of communication of the service line and the drain line to prevent communication between the lines, the second location being characterized by the piston being positioned so that the points of communication of both lines reside between the sealing members to permit communication between the lines via the cavity;

second means for biasing the first means into the first location;

third means operable by pressurized gas from the source for moving the first means from the first to the second location against the second means;

fourth means (i) for preventing operation of the third means whenever the electrical circuit is energized and (ii) or permitting operation of the third means whenever the electrical circuit is de-energized; and fifth means including electrically activated timer means for selectively momentarily de-energizing said electrical circuit to thereby permit momentary operation of the third means.

2. An improved drain valve as in claim 1, wherein:
the fourth means (i) prevents operation of the third means whenever the electrical circuit is energized and the fourth means is connected to the electrical circuit and (ii) permits operation of the third means whenever the electrical circuit is de-energized or the fourth means is disconnected therefrom.

3. An improved drain valve as in claim 2, wherein:
the fifth means includes a timer which periodically connects the fourth means to and disconnects the fourth means from the electrical circuit for predetermined times.

4. An improved drain valve as in claim 1, wherein:
the fourth means prevents or permits operation of the third means by respectively blocking or passing pressurized gas from the source to the third means.

5. An improved drain valve as in claim 1, wherein the tank receives pressurized air from the source and supplies pressurized air to a secondary tank which, in turn, supplies pressurized air to the system, wherein:
the pressurized air operating the third means is supplied by the secondary tank.

6. An improved drain valve as in claim 1, wherein:
the second means includes means for biasing the first means toward the first location when operation of the third means is prevented.

7. An improved drain valve as in claim 6, which further comprises:
sixth, manually operable means for moving the first means to the first location in aid of the second means when operation of the third means is prevented.

8. An improved drain valve as in claim 6, wherein:
the system includes an air compressor and the electrical circuit is an ignition circuit of the system.

9. An improved drain valve as in claim 6, wherein:
the device is a vehicle having pneumatic brakes operated by pressurized air and the electrical circuit is an ignition circuit of the vehicle.

10. An improved drain valve as in claim 1, wherein:
said fifth means includes means for periodically selectively momentarily de-energizing said electrical current.

11. An improved drain valve as in claim 10, wherein:
said fifth means includes means for providing a duration of about several seconds.

12. Apparatus for use in an automotive air pressure system employing an air pressure tank, a further tank accumulating moisture within the system and drain line and manual valving for draining the moisture from the further tank, the improvement for automatic draining of the wet tank upon vehicle shut down comprising:

valving means having an inlet port connected to the drain line and an outlet port venting to atmosphere and including a valve body having a piston therein, a valve piston movable within the valve bore between open and closed positions in respect to the inlet and outlet ports and a piston shut off spring urging the piston into closed position;

fluid valve actuation means operably connected to the valving means and adapted to move the valving means to closed position during vehicle operation and to open position during vehicle shut down and wherein the fluid valve actuation means during vehicle shut down applies a counter pressure against the piston shut off spring to cause the valve piston to move to open position; and electrically activated timer means operably connected to said valve actuation means for selectively momentarily moving the valving means to said open position during said vehicle operation.

13. The apparatus of claim 12 wherein the valve actuation means includes an air cylinder and piston rod interconnected to the vehicle air pressure system to apply the counter pressure to the piston shut off spring during vehicle shut down.

14. The apparatus of claim 13 wherein the valve actuation means further includes an electric solenoid valve between the vehicle pressure system and the air cylinder and energized by the vehicle electrical system and operable to apply the vehicle air pressure to the air cylinder only when the electric solenoid valve is disengaged.

15. The apparatus of claim 14 wherein the air cylinder includes spring means to continuously oppose the counter pressure of the air cylinder and piston rod upon the piston shut off spring but of a lesser magnitude than the counter pressure during the deenergization of the electric solenoid valve to provide a fail-safe arrangement.

* * * * *